July 30, 1929. A. ALDRICH Re. 17,381

PAPER MACHINE

Original Filed Feb. 14, 1924 5 Sheets-Sheet 1

Inventor:
Alonzo Aldrich,
A. Minn Beckwith Atty.

July 30, 1929. A. ALDRICH Re. 17,381

PAPER MACHINE

Original Filed Feb. 14, 1924 5 Sheets-Sheet 2

Inventor:
Alonzo Aldrich,
A. Miller Redfield Atty.

July 30, 1929. A. ALDRICH Re. 17,381

PAPER MACHINE

Original Filed Feb. 14, 1924 5 Sheets-Sheet 3

Inventor:
Alonzo Aldrich,
A. Ellis Bagnell Atty.

July 30, 1929. A. ALDRICH Re. 17,381

PAPER MACHINE

Original Filed Feb. 14, 1924 5 Sheets-Sheet 4

Inventor:
Alonzo Aldrich,
A. Miller Bagnell Atty.

July 30, 1929. A. ALDRICH Re. 17,381
PAPER MACHINE
Original Filed Feb. 14, 1924 5 Sheets-Sheet 5
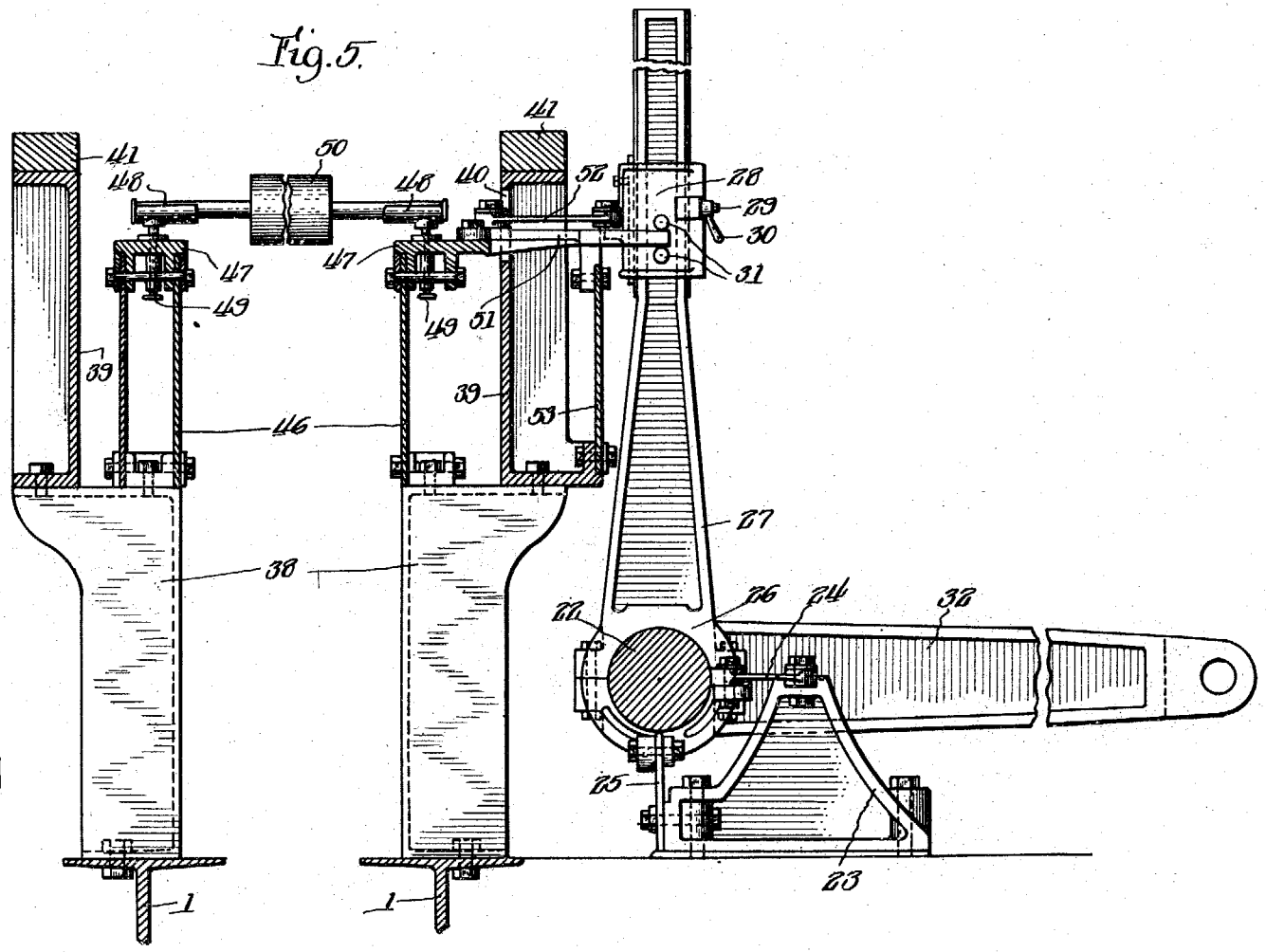
Inventor:
Alonzo Aldrich,
A. Milton Bergfield Atty Reissued July 30, 1929. Re. 17,381

UNITED STATES PATENT OFFICE.

ALONZO ALDRICH, OF BELOIT, WISCONSIN, ASSIGNOR TO BELOIT IRON WORKS, OF BELOIT, WISCONSIN, A CORPORATION OF WISCONSIN.

PAPER MACHINE.

Original No. 1,595,593, dated August 10, 1926, Serial No. 692,644, filed February 14, 1924. Application for reissue filed July 11, 1927. Serial No. 205,006.

This invention relates to the Fourdrinier end of a paper making machine wherein the usual heavy metal frame supporting the table rails, table rolls, deckle mechanisms and the breast roll is omitted thereby providing which may be termed a frameless type of Fourdrinier section having resilient wooden spring members on which the table rails and the breast roll are mounted independently of each other above a base which may be fixed or adjustable as desired.

It is an object of this invention to provide a Fourdrinier section of a paper making machine, said section having the various mechanisms to be shaken supported on wooden spring members affording a construction of reduced weight and cost, and one in which the Fourdrinier wire may be readily changed without excessive loss of time or excessive cost of labor.

It is also an object of the invention to provide a Fourdrinier section wherein the table roll rails and the breast roll are independently supported on different members and are adapted to be shaken either simultaneously or independently.

It is a further object of the invention to provide a Fourdrinier section wherein the breast roll and the table roll rails are supported on separate light weight resilient members and in which the breast roll, the table rolls and the deckle supports are adapted to be easily removed to permit the Fourdrinier wire to be readily changed.

It is furthermore an object of the invention to provide a Fourdrinier section wherein the breast roll and table rails are independently connected to a shaker mechanism so that the breast roll connections with the shaker mechanism may be removed if desired and a shake imparted to the table rails only.

It is an important object of this invention to provide a paper making machine with a Fourdrinier section of a frameless type and wherein the mechanisms to be shaken are supported only by resilient members mounted on a supporting base which may be fixed or pivoted and provided with means for adjusting the same.

Other and further important objects of this invention will be apparent from the disclosures in the drawings and specifications.

The invention (in a preferred form) is illustrated on the drawings and hereinafter more fully described.

On the drawings:

Figure 2 is a fragmentary rear elevation thereof showing the pivot supporting parts and the adjusting means for the section.

Figure 5 is a fragmentary enlarged detail section taken on line 5—5 of Figure 2 with parts omitted.

As shown on the drawings:

Figure 1:
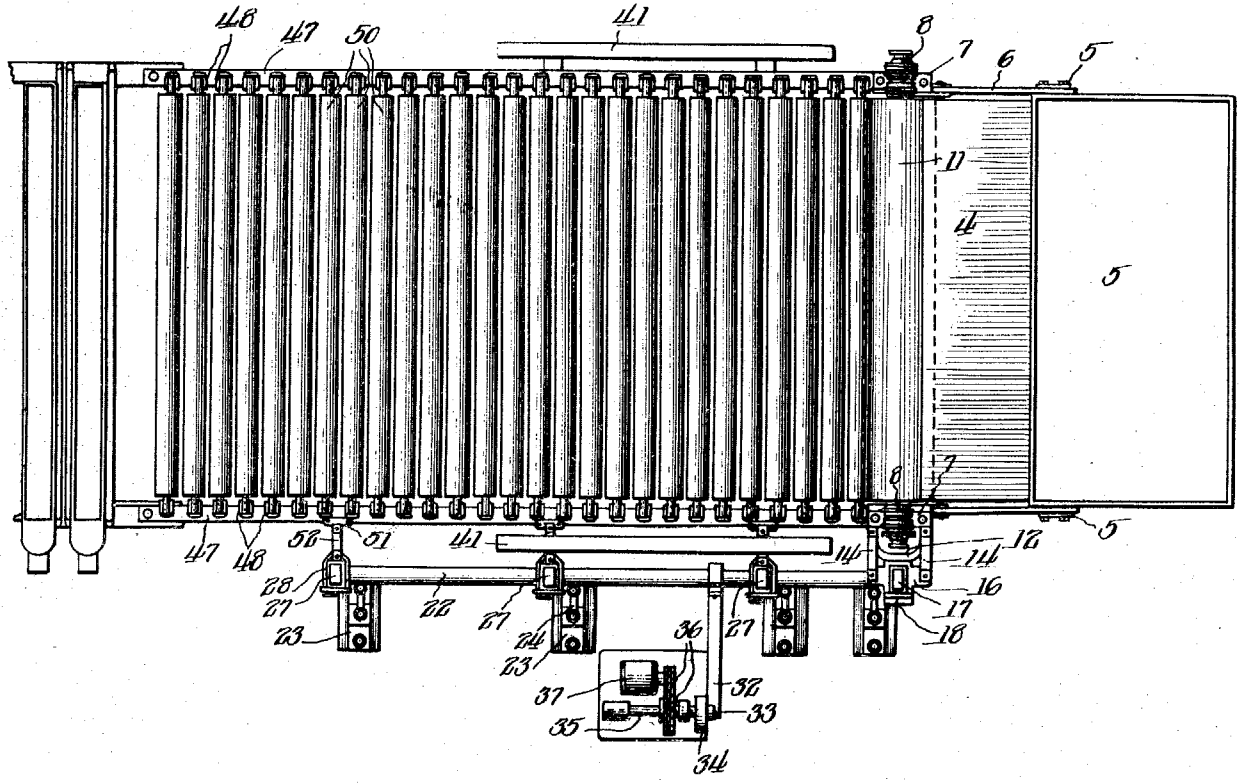
Figure 1 is a plan view of a Fourdrinier section embodying the principles of this invention and with the parts at the pivoted end of the section and with the Fourdrinier wire omitted.
Figure 7:
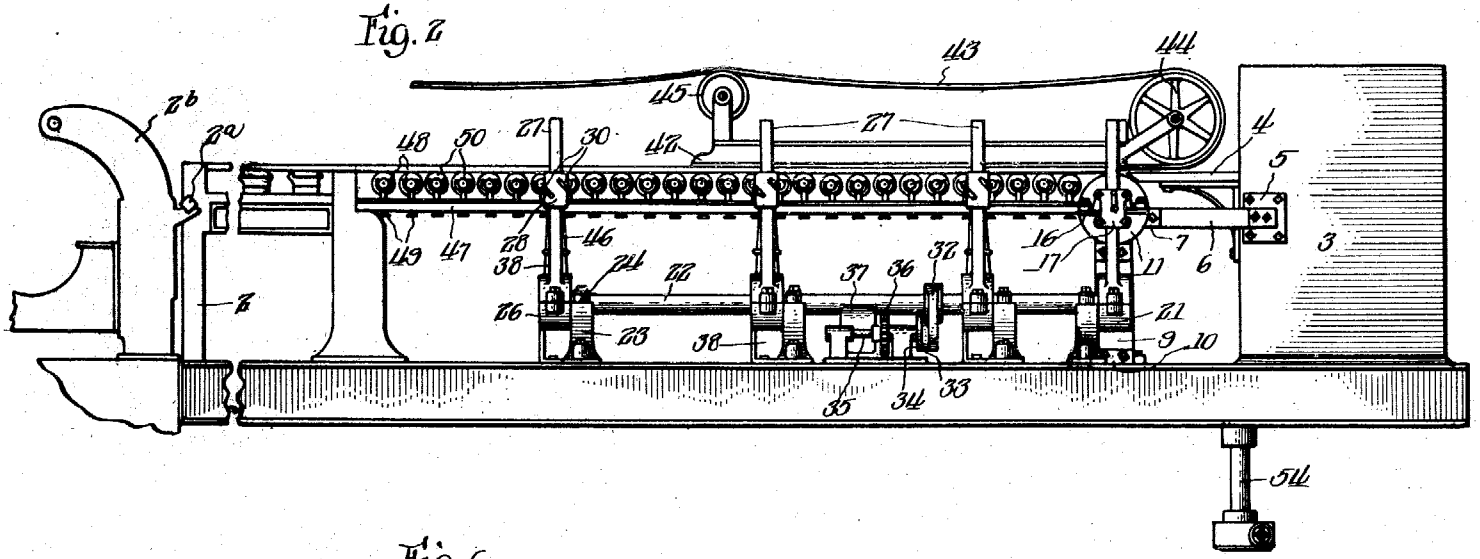

The reference numeral 1 indicates base I-beams which form a base section for the Fourdrinier end of a paper making machine. Upright members 2 are mounted at one end of the beams 1 and are pivoted at $2^a$ on fixed supports $2^b$ to permit the opposite end of said base beams to be adjusted by screw-jacks 54 or any other suitable raising and lowering mechanisms desired. Mounted upon one end of the base section is a head or flow box 3 provided with an apron board 4. Secured to the sides of the flow box 3 are bracket plates 5 to which are removably bolted or otherwise secured the ends of wooden strips or springs 6. The wooden springs 6 are also removably bolted to breast roll supporting brackets 7 on which the breast roll bearings 8 are supported. The brackets 7 are also supported by pairs of upright wooden strips or springs 9 the lower ends of which are removably secured by bolts to metal brackets 10 fastened to the base members 1. Journalled in the bearings 8 are the journals of a breast roll 11.

Formed on the front breast roll supporting bracket 7 is a side bracket 12 to which a U-shaped arm 13 is bolted. Removably connected to opposite sides of the front breast roll bearing 8 are the inner ends of a pair of wooden strips or springs 14 the outer ends of which are removably connected to projecting lugs or arms 16 formed on opposite sides of a yoke 17 which is slidably engaged on a shaker arm or lever 18. The yoke 17 is held in position on the shaker lever 18 by means of the yoke arms 13. A handle nut 19 and bolt 20 are provided to permit the yoke 17 to be removed from the lever 18. The arms 13 slidably project between the projecting lugs 16 and pins or projections 15 formed on the sides of the yoke 17. The breast roll shaker lever 18 is provided with a split bearing 21 at its lower end which is clamped onto a shaker shaft 22 positioned longitudinally along the rear side of the machine.

Secured to the floor in rear of the shaker shaft 22 are a plurality of spaced pedestals or supports 23 each having secured to the top thereof a wooden strip or spring 24. An upright wooden strip or spring 25 is also secured to each pedestal 23. The springs 24 and 25 are removably secured to the split bearings 26 of a plurality of shaker arms or levers 27 which are secured on the shaker shaft 22 and support the same in position with the aid of the springs 24 and 25. The springs 24 and 25 on the pedestal nearest the flow box end are removably secured to the lever bearings 21. The mounting for the shaker shaft 22 is claimed in my copending application, Serial Number 5,696, filed January 30, 1925, which in so far as its subject matter is disclosed herein is a division of the present application.

Movably engaged on each of the shaker levers 27 is a yoke 28. Bolts 29 and handle nuts 30 are provided to permit the yokes 28 to be removed from the levers 27. Guide pins or projections 31 are formed on the sides of each yoke 28. Engaged on the shaker shaft 22 is a lever or arm 32 the outer end of which is connected to a link 33. The link 33 is eccentrically connected to a disk 34 rotated by the shaft 35. The shaft is operated by means of gears 36 driven by a motor 37.

Secured at intervals upon each base beam 1 are upright supports or pedestals 38 on the tops of which are secured extension arms 39. The arms 39 on the rear side of the machine are provided with openings 40 (Figure 5). Deckle bars 41 are supported upon the tops of the arms 39 on each side of the machine and support the deckle rails 42. Deckle straps 43 are trained around deckle pulleys 44 and are supported at intervals by suitable wheels or pulleys 45.

Also mounted upon each pedestal 38 to the inside of the arm 39 are upright wooden springs 46. Bolted to the tops of the springs 46 are the table roll rails 47. Mounted on the rails 47 are a plurality of table roll bearings 48 each of which is provided with an adjusting mechanism 49. Table rolls 50 are supported in the bearings 48 beneath the deckle straps 43. The Fourdrinier wire has been omitted for the sake of clearness.

Secured to the rear table roll rail are a plurality of forked guide members 51 the forked ends of which slidably project between the guide pins 31 on the sides of the yokes 28 and support said yokes on the levers 27. Removably connected to the inner ends of the guide members 51 are the inner ends of wooden shaker strips or springs 52. The outer ends of the shaker springs 52 are removably connected to the yokes 28. Wooden springs 53 are supported on the front arms 39 with the upper ends of said springs 53 supporting the outer end portions of the guide members 51.

Figure 6:
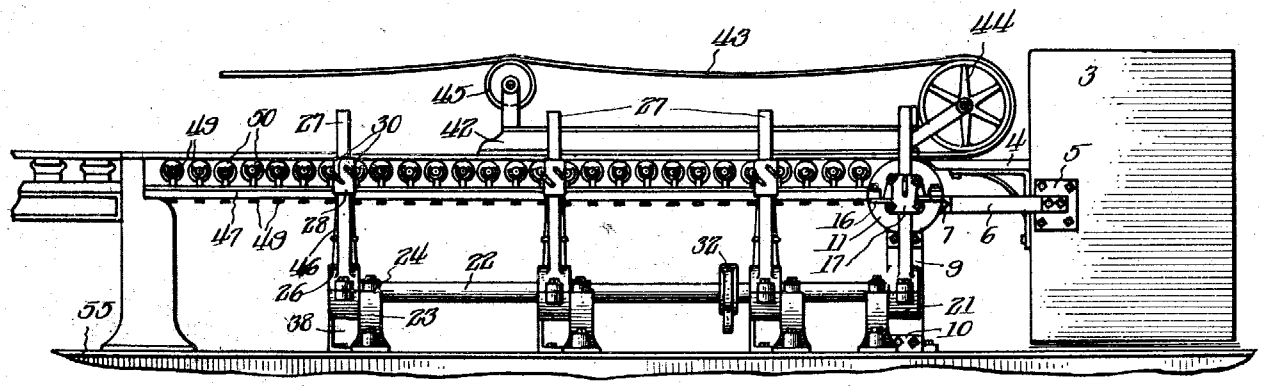
Figure 6 is a modification illustrating a fragmentary rear elevation of the flow box end of a Fourdrinier section mounted on a fixed base.
Figure 3:
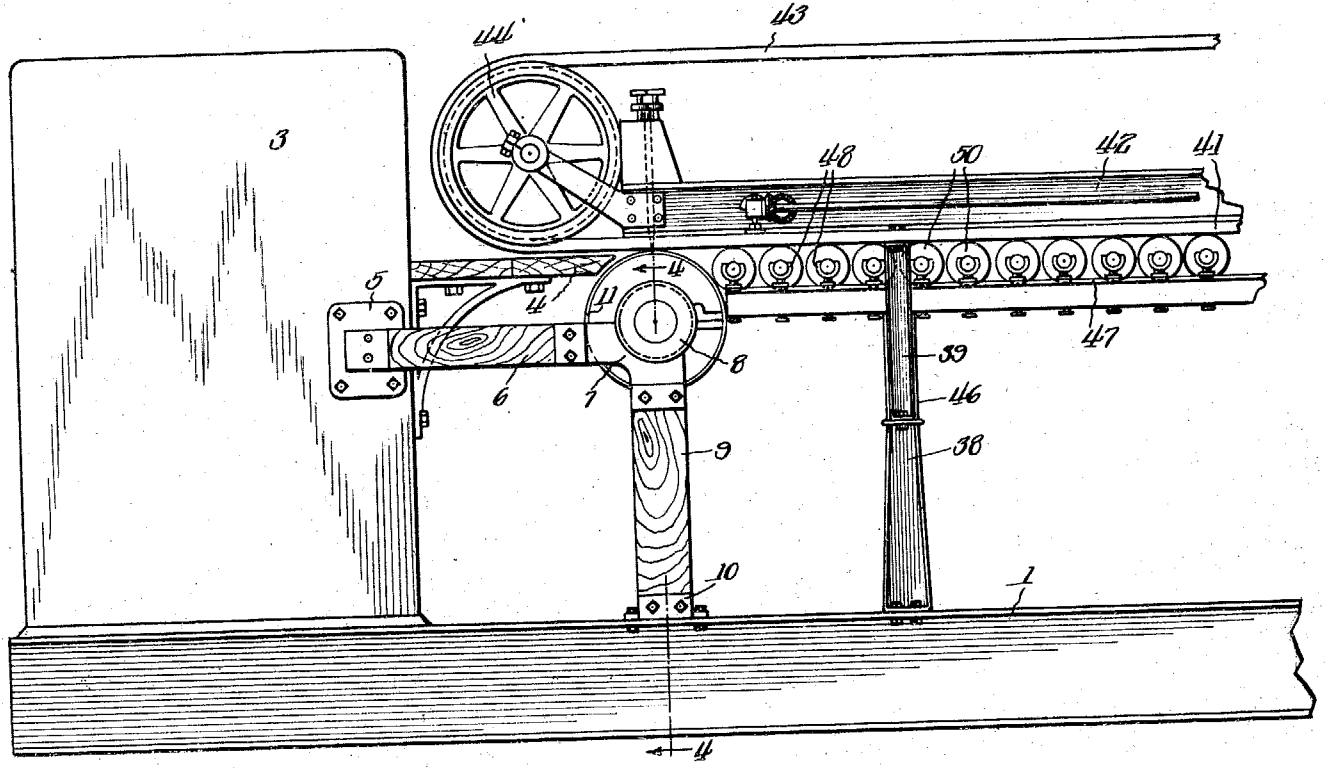
Figure 3 is a fragmentary front side elevation of the flow box end of the Fourdrinier section.
Figure 4:
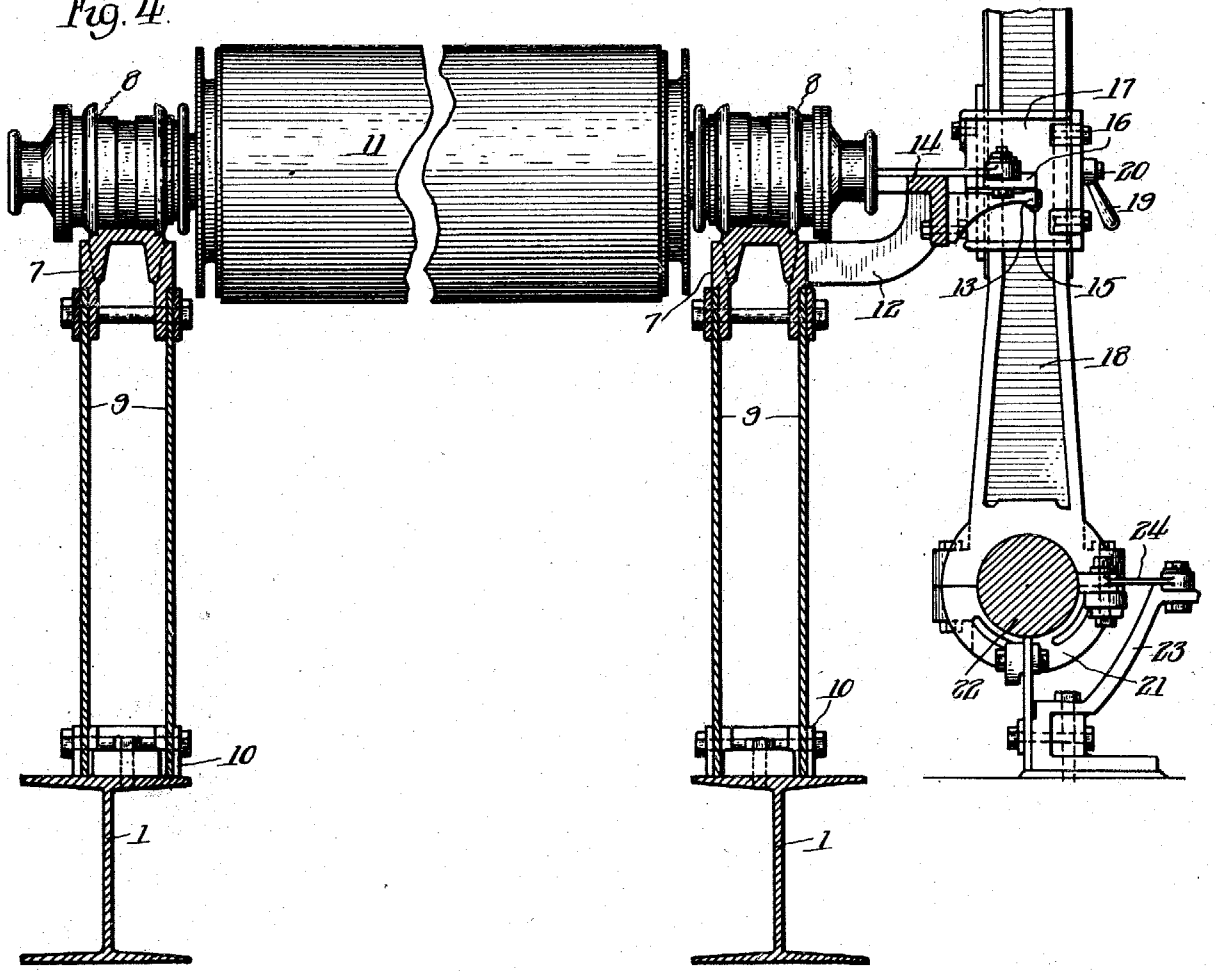
Figure 4 is an enlarged transverse section taken on line 4—4 of Figure 3 with parts omitted and with parts illustrated in elevation.

Figure 6 is a fragmentary rear side elevation of a modified form of one end of a Fourdrinier section wherein the parts are supported upon a fixed base 55 instead of on a pivoted base as illustrated in Figure 2.

The operation is as follows:

It will be noted that a Fourdrinier section of a paper making machine has been illustrated and described in which the ordinary expensive and cumbersome supporting frame for the breast roll and table rails is omitted and replaced by spring supports thereby affording a substantially frameless type of Fourdrinier section.

The shaker mechanisms are operated from the motor 37 which rotates the meshing gears 36, the shaft 35 and the disk 34. Rotation of the disk 34 actuates the eccentric link 33 thereby causing the lever 32 to swing upwardly and downwardly to reciprocate the shaker shaft 22. The shaker arms 18 and 27 are thereby rocked toward and away from the table rails and by means of the members 52 cause shaking of the table rails 47 and the table rolls supported thereon. The shaker arm 18 actuates the members 14 thereby causing a shaking motion to be imparted to the breast roll and the Fourdrinier wire. The upright wooden spring members 9 and the spring members 6 resiliently support the breast roll and permit the shaking motion to be transmitted thereto. If desired the connecting members 14 may be removed so that a shake will not be transmitted to the breast roll but only to the table rails.

The spring members 24 and 25 connected to the pedestals 23 serve as resilient supports for the shaker shaft 22. As illustrated in the drawings the resilient wooden spring members 46 support the table rails and permit the same to be shaken by the shaker apparatus hereinbefore described.

The deckle mechanisms are supported upon the deckle bars 41 and are not subjected to the shaking action. The deckle rails may be readily raised or removed if desired to afford access to the breast roll when it is desired to remove the same.

With the omission of the heavy supporting frame a lighter weight and less expensive construction is provided in which the wooden supporting spring members take the place of the ordinary heavy metal frames and in which the breast roll, the table rolls and the deckle supports are adapted to be readily removed thereby permitting the Fourdrinier wire to be rapidly replaced when necessary. The spring supporting members are so arranged that access may be readily had to all parts of the Fourdrinier section which was not possible in the old heavy frame type of Fourdrinier constructions.

The base members may be adjusted by means of the screw-jacks 54 about the pivot members $2^a$ to give the necessary pitch to the wire of the Fourdrinier section.

While the supports 6, 9, 24, 25, 46 and 53 are described as wooden members it will of course be understood that they may be made of any other desired materials.

I am aware that numerous details of construction may be varied through a wide range without departing from the principles of this invention, and I therefore do not purpose limiting the patent granted, otherwise than necessitated by the prior art.

Certain of the subject matter of this application is disclosed and broadly claimed in copending applications of mine, Serial No. 595,258 filed October 18, 1902; No. 648,959, No. 648,960, No. 648,961 and No. 948,962 filed July 2, 1923, respectively and hence is not so claimed in this application.

I claim as my invention:

1. In a Fourdrinier section the combination with a breast roll and table rails, of a base section, spring members on said base section for independently supporting the breast roll and said table rails, and a shaker mechanism independently connected to simultaneously shake the breast roll and the table rails.

2. A Fourdrinier section of a paper making machine comprising a base section, a breast roll and table rails, spring members on said base section supporting the breast roll and said table rails, a shaker device, and spring members independently connecting the shaker device with said breast roll and with said table rails to simultaneously or independently shake the same.

3. A Fourdrinier section of a paper making machine comprising a base section, a flow box supported thereon, a breast roll, spring members connected to the base section and to the flow box to support the breast roll in position, table rails, spring members on said base section for supporting the table rails, a shaker device, means for operating the same, and spring members independently connecting the shaker device with the breast roll and with the table rails.

4. A Fourdrinier section of a paper making machine comprising a base, a flow box supported thereon, a breast roll, members connected to the base and to the flow box to support the breast roll in position, table rails, members supporting the table rails on said base, a shaker device, resilient members supporting said shaker device, means for operating the shaker device, and resilient members independently connecting said shaker device with the breast roll and with said table rails to impart a shake to the table rails only when the resilient members connected to the breast roll are disconnected.

5. A Fourdrinier section of a paper making machine comprising a base, means for adjusting the same, a flow box supported on the base, a breast roll, resilient members connected to the base and to said flow box for supporting the breast roll in position, supports mounted on the base, deckle rails mounted on said supports, table rails, resilient members on said supports for holding the table rails in position beneath the deckle rails, a shaker device, resilient members for supporting the same, means for operating the shaker device, and independent resilient members connecting the shaker device with the breast roll and with the table rails to transmit a shake thereto.

6. In a Fourdrinier section of a paper making machine, a breast roll, table rails, a base, supports on the base for independently supporting roll and table rails, and means independently connected to the breast roll and said table rails to shake the table rails only when the breast roll is disconnected from said means.

7. In a Fourdrinier section the combination with a breast roll and table rails, of a base and means for independently supporting the breast roll and table rails on the base, and means for independently shaking the breast roll and the table rails.

8. In a Fourdrinier section, the combination with a breast roll and table rails, of a base on which said breast roll and table rails are mounted and resiliently supported shaker mechanism connected with the breast roll and table rails to impart a shake thereto.

9. The combination with a Fourdrinier section, of a base, a shaker device, resilient members supporting the shaker device, and resilient members connecting the shaker device with the Fourdrinier section.

10. In a Fourdrinier section the combination with a base, of uprights supported thereon, deckle rails supported on said uprights, table rails, and members on said uprights for movably supporting the table rails in position.

11. In a Fourdrinier section the combination with a base, of uprights supported thereon, a deckle device supported thereon, table rails, members on said uprights for movably supporting the table rails above said base, and means connected with said table rails to shake the same.

12. A Fourdrinier section comprising a support, a base pivoted thereon, means for adjusting said base about the pivot point thereof, a breast roll and table rails above said base, and members for movably supporting the breast roll and said table rails on said base independently of each other.

13. A Fourdrinier section comprising a base, a breast roll and table rails above said base, members for movably supporting the breast roll and the table rolls on said base independently of each other, and a shaker device independently connected to both the breast roll and said table rails to impart a shake thereto.

14. A Fourdrinier section comprising a base, a breast roll and table rails above said base, members for independently supporting the breast roll and said table rails on said base, a shaker device, and removable members independently connecting the breast roll and said table rails with said shaker device to permit a shake to be imparted to the table rails only, when the members between the breast roll and the shaker device are disconnected.

15. In a Fourdrinier section, the combination with a base and a breast roll and table rails mounted thereon, of means for shaking the table rails only.

16. In a Fourdrinier section, the combination with a base, of a breast roll and table rails, of means for independently supporting the same, and means independently connected to the breast roll and table rails to shake the table rails only when the breast roll is disconnected from said means.

17. In a Fourdrinier section, the combination with a base and a breast roll and table rails, of means for supporting said breast roll and table rolls independently by the base, and means independently connected to the breast roll and table rolls to shake the breast roll only when the table rolls are disconnected.

18. In a Fourdrinier machine the combination with a flow box and a breast roll, of means for supporting the breast roll including spring members connected to the flow box.

19. A Fourdrinier machine having a flow box and a breast roll, and spring supporting means for the breast roll, some of which extend upwardly to the breast roll and others of which extend horizontally to the flow box.

20. The combination with a breast roll and flow box, of a support below the breast roll, and means for supporting the breast roll comprising flexible members mounted on the support and extending to the breast roll and horizontal flexible members connected to the flow box and extended therefrom to the breast roll.

21. In a Fourdrinier machine, the combination of a table having longitudinally extending side members mounted on the table for lateral shaking movement independent of the main body of the table, table rolls mounted on said shakable side members and means for shaking said side members, said shaking means being attached to a relatively stationary part of the table and extended to and connected with said shakable members.

22. In a Fourdrinier machine, the combination of a table having longitudinally extending side members mounted on the table for lateral shaking movement independent of the main body of the table, table rolls mounted on said shakable side members and means for shaking said side members so as to shake said rolls, said shaking means comprising a plurality of reciprocatory members attached at intervals to one of said shakable side members, and mechanism mounted on the table for actuating said reciprocatory members.

23. In a Fourdrinier machine, the combination with a table, of table rolls carried by the table and mounted for horizontal shaking movement independent of the table and a breast roll also carried by the table and mounted for horizontal shaking movement independent of the table.

24. In a Fourdrinier machine, the combination with a table of table rolls carried by the table and mounted for horizontal shaking movement independent of the table, a breast roll carried by the table and also mounted for horizontal shaking movement independent of the table, and means for shaking said table and breast rolls independently of the table.

25. In a Fourdrinier machine, the combination with the table of flexible upright members carried by the table, and arranged to permit shaking movement independent of the table, and table and breast rolls mounted on said members.

26. In a Fourdrinier machine, the combination with the table of flexible upright members carried by the table and arranged to permit shaking movement independent of the table, and table and breast rolls mounted on said members and mechanism for shaking said members.

27. In a Fourdrinier machine, the combination with the table of flexible upright members carried by the table and arranged to permit shaking movement independent of the table, and table and breast rolls mounted on said members and mechanism for shaking said members, said mechanism comprising reciprocatory members attached to said members.

28. In a Fourdrinier machine, the combination with the table of shakable side members carried by the table and mounted for shaking movement independent of the table, and table and breast rolls mounted on said side members and mechanism for shaking said side members, said mechanism being attached to a relatively stationary part of the table and extending to and being connected with said side members.

29. The combination with the table of flexible upright table roll supports and means for shaking said supports mounted on the table.

30. A Fourdrinier machine having table roll shaking mechanism mounted on the table.

31. A Fourdrinier machine having roll shaking mechanism mounted on the table.

32. A Fourdrinier machine having breast roll shaking mechanism mounted on the table.

33. A Fourdrinier machine having table and breast roll shaking mechanism mounted on the table.

34. In a Fourdrinier machine, the combination with the table of a breast roll mounted for longitudinal movement independent of the table, and means for vibrating said breast roll independently of the table, said means comprising a rotary shaft provided with an eccentric and a connection between the same and the breast roll.

35. In a Fourdrinier machine, the combination with the table, of a breast roll and means for mounting said breast roll to permit movement thereof laterally of the table, said means comprising flexible supports supporting the bearings for the breast roll shaft, said flexible supports comprising wooden members secured to the table at one end and to the breast roll bearings at their other ends.

36. In a Fourdrinier machine, the combination with a table, of table rolls mounted for horizontal shaking movement independent of the table, and a breast roll also mounted for horizontal shaking movement independent of the table, and also independent of the table rolls.

37. In a Fourdrinier machine, the combination with table rolls mounted for horizontal shaking movement, and a breast roll also mounted for horizontal shaking movement independent of the table rolls.

38. In a Fourdrinier machine, the combination with breast and table rolls of means for supporting said rolls for independent shaking movement.

39. In a Fourdrinier machine, the combination with breast and table rolls of means for supporting said rolls for independent shaking movement, and means for independently shaking said rolls.

40. In a Fourdrinier machine, the combination of breast and table rolls and resilient members independently supporting said rolls to permit independent shaking movement thereof.

41. In a Fourdrinier machine, the combination of breast and table rolls and resilient members independently supporting said rolls to permit independent shaking movement thereof, and means for shaking said rolls.

42. In a Fourdrinier machine, the combination of breast and table rolls and resilient members independently supporting said rolls to permit independent shaking movement thereof, and means for shaking said rolls, said shaking means being mounted on the table.

43. In a Fourdrinier machine, the combination of a table, table and breast rolls mounted on said table, said rolls being mounted so as to permit horizontal shaking movement thereof relatively to and independently of the table, and means for horizontally shaking said rolls.

44. In a Fourdrinier machine, the combination of a table, table and breast rolls mounted on said table, said rolls being mounted so as to permit horizontal shaking movement thereof relatively to and independently of the table, and means for horizontally shaking said rolls, said shaking means being carried by the table.

45. In a Fourdrinier machine, a vertically adjustable table provided with independently shakable rolls.

46. A Fourdrinier machine having a vertically adjustable table provided with table and breast rolls which are mounted for shaking movement independent of the table.

47. A Fourdrinier machine having a vertically adjustable table provided with table and breast rolls which are mounted for shaking movement independent of the table and also independent of each other.

48. A Fourdrinier machine having a vertically adjustable table provided with table and breast rolls which are mounted for shaking movement independent of the table, and means mounted on the table for shaking said rolls.

49. In a Fourdrinier machine, the combination with the table of flexible upright roll supports, and means for shaking said supports mounted on the table.

50. In a Fourdrinier machine, the combination with the table of a breast roll and flexible supports for the same, and means for shaking said breast roll mounted on the table.

51. A Fourdrinier machine having a vertically adjustable table and also having means for shaking the wire independent of the table.

52. A Fourdrinier machine having a vertically adjustable table and also having means for shaking the wire independent of the table, said means being mounted on the table.

53. A Fourdrinier machine having means for mounting the breast roll and table rails for independent shaking movement.

54. A Fourdrinier machine having means for connecting the breast roll and table rails independently to a shaking mechanism.

55. In a Fourdrinier machine, the combination with the breast roll and table rails, of means for independently supporting the same, and means for idependently shaking the breast roll and table rails.

56. In a Fourdrinier machine, the combination with the breast roll and table rails, of means for independently supporting the same, a shake mechanism, and means for independently connecting the breast roll and table rails with said shake mechanism.

57. The combination with the breast roll and table rails, of a shake mechanism and means whereby said breast roll and table rails may be independently connected and disconnected with the shake mechanism to permit either the breast roll or table rails to be shaken without shaking the other.

58. The combination with the breast roll and table rails, of a shake mechanism, and means whereby the table rails may be shaken while the breast roll remains stationary.

In witness whereof, I hereunto subscribe my name this 27th day of June, A. D. 1927.

ALONZO ALDRICH.